May 2, 1933. C. E. FOX 1,907,291
MOWING MACHINE ATTACHMENT
Filed Jan. 4, 1932
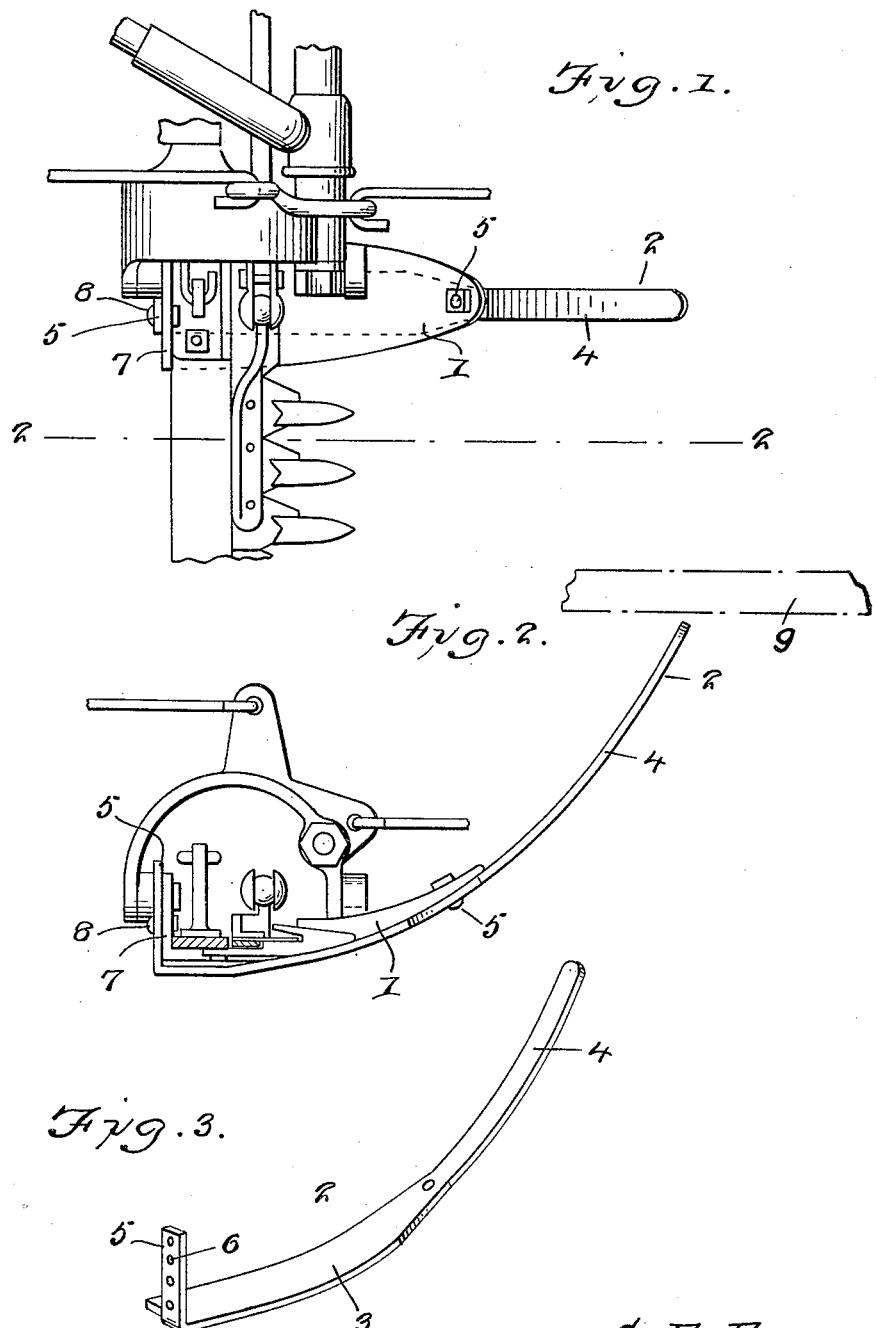
C. E. Fox
INVENTOR
BY Victor J. Evans & Co.
ATTORNEY Patented May 2, 1933

1,907,291

UNITED STATES PATENT OFFICE

CHARLES E. FOX, OF LANGLOIS, OREGON

MOWING MACHINE ATTACHMENT

Application filed January 4, 1932. Serial No. 584,679.

The object of this, my present invention, is the provision of an attachment to be used on the inner shoe of the cutter bar of any well known type of mowing machine and which is of a construction to cause the cutter bar to ride over the swath on the field and at the same time hold the grass, alfalfa, etc., so that it cannot become entangled with the knife or shoe head to permit of the machine cutting heavy growths of tangled grass, alfalfa or the like which cannot be successfully accomplished by the ordinary mowing machine unless one or more farm hands are employed for following the machine and for raking or pitching the grass, etc., that has been cut to one side and away from the shoe of the cutter bar, as otherwise the shoe and cutter bar become clogged which necessitates the operator stopping the machine to clean the bar at frequent intervals.

A further object is the provision of an attachment for this purpose which can be readily and adjustably secured upon the inner shoe of the mowing machine and which after being attached thereto requires no further attention.

To the attainment of the foregoing the invention consists in the improvement as hereinafter described and definitely claimed.

In the drawing:

Figure 1 is a sufficient portion of a mowing machine to illustrate the application of my improvement thereon.

Figure 2 is a sectional view approximately on the line 2—2 of Figure 1.

Figure 3 is a perspective view of the attachment.

In the drawing the numeral 1 designates the inner shoe of the cutter bar of an ordinary mowing machine. This shoe is provided with the usual sole and wear plate which, in the present instance, is removed and is replaced by my attachment. The attachment 2 comprises a metal bar that has a widened and arched portion 3 merging, at its forward end, to an upwardly rounded or arched finger 4. A single bolt or rivet 5 passes through the finger at its juncture with the plate 3 and through the forward end of the shoe 1, and the rear of the plate 3 is provided with an upstanding flange 5 that has a series of apertures 6 therethrough. There is designed to be passed through one of these apertures and through an aperture in the upstanding lug 7 at the rear of the shoe 1 a removable element such as a bolt 8 which is engaged by a nut. The arched finger 4 is of such length so that its outer end reaches approximately to the height of the tongue 9 of the mowing machine as shown in Figure 2. The attachment is of an extremely simple construction and the body portion thereof may be adjusted with respect to the shoe 1 but the same is rigidly supported upon the shoe when thus adjusted. The finger 4 serves as a means for directing the growth beneath the body portion 3, thus raising the cutter bar and shoe to prevent the clogging of the shoe and cutter bar.

It is thought that the foregoing description, when read in connection with the accompanying drawing, will fully and clearly set forth my construction, its simplicity and its advantages to those skilled in the art to which such invention relates so that further detailed description will not be required.

Having described the invention, I claim:

1. An attachment for the inner shoe of the cutter bar of a mowing machine and comprising an arched plate having its forward end provided with an arched finger extension reaching approximately to the height of the tongue of the machine and which is pivotally secured to the outer end of the shoe, said plate having its rear end formed with an upstanding flange that is provided with a series of spaced vertically arranged apertures, and removable means passing through one of the apertures and through the rear of the shoe for adjustably securing the plate to the said rear of the shoe.

2. A mowing machine attachment comprising a plate, means on the rear end of the plate for adjustably securing the latter to the rear end of the inner shoe of the cutter bar of a mowing machine, means for securing the forward end of the plate to the shoe, and an arched finger rising from the forward end and reaching approximately to the height of the tongue of the machine.

In testimony whereof I affix my signature.

CHARLES E. FOX.